US008889801B2

(12) United States Patent
Liao et al.

(10) Patent No.: US 8,889,801 B2
(45) Date of Patent: Nov. 18, 2014

(54) SURFACE PROTECTIVE COATING AND METHODS OF USE THEREOF

(75) Inventors: Wen P. Liao, Clifton Park, NY (US); Steven R. Mordhorst, Marysville, OH (US); Lai N. Tan, Plymouth, MI (US)

(73) Assignee: Momentive Performance Materials, Inc., Waterford, NY (US)

( * ) Notice: Subject to any disclaimer, the term of this patent is extended or adjusted under 35 U.S.C. 154(b) by 1033 days.

(21) Appl. No.: 12/607,413

(22) Filed: Oct. 28, 2009

(65) Prior Publication Data

US 2011/0097586 A1 Apr. 28, 2011

(51) Int. Cl.
C08F 283/12 (2006.01)
C09D 183/14 (2006.01)
C08F 230/08 (2006.01)
C08K 3/22 (2006.01)
C08K 5/5419 (2006.01)

(52) U.S. Cl.
CPC ............ C09D 183/14 (2013.01); C08F 230/08 (2013.01); C08K 3/22 (2013.01); C08K 5/5419 (2013.01)
USPC ...................................................... 525/479

(58) Field of Classification Search
USPC ...................................................... 525/479
See application file for complete search history.

(56) References Cited

U.S. PATENT DOCUMENTS

| | | | |
|---|---|---|---|
| 3,175,993 A | 3/1965 | Weyenberg | |
| 3,542,830 A | 11/1970 | Kim et al. | |
| 3,627,801 A | 12/1971 | Pierce et al. | |
| 3,708,225 A | 1/1973 | Misch et al. | |
| 3,976,497 A | 8/1976 | Clark | |
| 3,986,997 A | 10/1976 | Clark | |
| 4,027,073 A | 5/1977 | Clark | |
| 4,159,206 A | 6/1979 | Armbruster et al. | |
| 4,170,690 A | 10/1979 | Armbruster et al. | |
| 4,197,230 A | 4/1980 | Baney et al. | |
| 4,309,319 A | 1/1982 | Vaughn, Jr. | |
| 4,324,712 A | 4/1982 | Vaughn, Jr. | |
| 4,368,235 A | 1/1983 | Vaughn, Jr. | |
| 4,371,585 A | 2/1983 | Memon | |
| 4,374,674 A | 2/1983 | Ashby et al. | |
| 4,395,526 A | 7/1983 | White et al. | |
| 4,563,498 A | 1/1986 | Lucas | |
| 4,624,870 A | 11/1986 | Anthony | |
| 4,680,232 A | 7/1987 | Factor et al. | |
| 4,695,603 A | 9/1987 | Inoue et al. | |
| 4,772,675 A | 9/1988 | Klosowski et al. | |
| 4,863,520 A | 9/1989 | Factor et al. | |
| 4,888,380 A | 12/1989 | Kamis et al. | |
| 4,914,143 A | 4/1990 | Patel | |
| 5,013,788 A | 5/1991 | Nagashima et al. | |
| 5,091,460 A | 2/1992 | Seto et al. | |
| 5,190,804 A | 3/1993 | Seto et al. | |
| 5,202,404 A * | 4/1993 | Takarada et al. ................ | 528/34 |
| 5,314,981 A | 5/1994 | Takago et al. | |
| 5,391,795 A | 2/1995 | Pickett | |
| 5,514,741 A | 5/1996 | Arai et al. | |
| 5,605,958 A | 2/1997 | Yoneda et al. | |
| 5,633,311 A | 5/1997 | Yamamoto et al. | |
| 5,705,591 A | 1/1998 | Matsuda et al. | |
| 5,853,896 A | 12/1998 | Kondo et al. | |
| 5,902,851 A * | 5/1999 | Yamaki et al. ................ | 524/506 |
| 5,919,886 A | 7/1999 | Matsuda et al. | |
| 6,011,123 A | 1/2000 | Kurosawa et al. | |
| 6,313,233 B1 | 11/2001 | Kurosawa et al. | |
| 6,319,980 B1 | 11/2001 | Ishikawa et al. | |
| 7,226,982 B2 | 6/2007 | Yamaya et al. | |
| 7,482,062 B2 | 1/2009 | Higuchi et al. | |
| 2003/0087102 A1 | 5/2003 | Yamaya et al. | |
| 2003/0212197 A1 | 11/2003 | Sakamoto et al. | |
| 2006/0014842 A1* | 1/2006 | Li et al. ........................... | 521/61 |
| 2006/0083936 A1* | 4/2006 | Higuchi et al. ................ | 428/447 |
| 2008/0217577 A1 | 9/2008 | Hayes | |

FOREIGN PATENT DOCUMENTS

| | | |
|---|---|---|
| CA | 1015888 | 8/1977 |
| EP | 0513690 | 11/1992 |
| EP | 1375615 | 1/2004 |
| JP | 63-168470 | 7/1988 |
| JP | 01275130 | 11/1989 |
| JP | 03-207774 | 11/1991 |
| JP | 06025600 | 1/1994 |
| JP | 10-273623 | 10/1998 |
| JP | 10-279804 | 10/1998 |
| JP | 11-152446 | 6/1999 |
| JP | 2004255643 | 9/2004 |
| WO | 2009099106 | 8/2009 |

* cited by examiner

*Primary Examiner* — Kuo-Liang Peng
(74) *Attorney, Agent, or Firm* — Hoffman Warnick LLC

(57) ABSTRACT

A coating composition suitable for providing a thermoformable hardcoat is disclosed. The composition contains a silane-containing oligomer (A), a silane (B) having the general formula $R^3{}_d SiX_{(4-d)}$ wherein each occurrence of $R^3$ is independently a C1-C8 alkyl, C2-C8 alkenyl or C6-C20 aryl, each occurrence of X is a halogen atom, C1-C6 alkoxy, C1-C6 acyloxy, C1-C6 alkenoxy or hydroxide; d is 0, 1 or 2, a metal oxide (C) and a condensation catalyst (D) wherein components (A), (B) and (C) are hydrolytically condensed in the presence of component (D) to achieve a $T^3$ to $T^2$ ratio of from about 0.3 to about 2.5.

40 Claims, No Drawings

SURFACE PROTECTIVE COATING AND METHODS OF USE THEREOF

FIELD

The present invention relates to flexible, mar-resistant protective coating compositions and coated articles using the same. More particularly, it relates to thermoformable hardcoat compositions that are suitable for use in demanding thermoforming applications. The present invention also relates to methods of processing thermoformable hardcoat compositions.

BACKGROUND

Transparent thermoplastics have replaced glass in many applications. Exemplary products made from transparent thermoplastics include glazing for buildings, or public transportation vehicles, such as trains, buses and airplanes, lenses for eye-glasses and other optical instruments and the like. While thermoplastics are lighter and more shatter resistant than glass, their abrasion resistance is relatively low. Typically, with even ordinary use in the presence of dust, contact with abrasives, cleaning equipment, and weathering, these transparent plastics may be marred or scratched. This lack of surface hardness and abrasion resistance severely restricts the use of transparent thermoplastic materials.

There is a significant body of technology dealing with means of coating transparent thermoplastics to improve the abrasion resistance of these materials. For example, coatings formed from mixtures of silica, such as colloidal silica or silica gel, and hydrolysable silanes in a hydrolysis medium have been developed to impart scratch resistance. U.S. Pat. Nos. 3,708,225, 3,986,997, 3,976,497, 4,368,235, 4,324,712, 4,624,870 and 4,863,520 describe such compositions and are incorporated herein by reference in their entireties.

While these coating compositions may be useful in imparting mar resistance, they are typically rigid upon curing. Accordingly, bending or re-shaping the plastic sheets coated with these compositions often leads to micro-cracking. For this reason, current commercial hardcoatings are typically used on flat thermoplastics or pre-shaped articles. However, there is a strong need in the industry to manufacture mar-resistant articles by thermoforming pre-hardcoated thermoplastic sheets, i.e., applying a hardcoat to a plastic sheet first, then heating the sheet to its softening temperature and subsequently forcing the hot material against the contours of a mold by mechanical or pneumatic techniques. This is especially true for applications involving coating complex shapes where conventional coating processes have difficulties applying lacquer evenly to completely cover all surfaces.

Many attempts have been made in the coating industry to improve the flexibility of hardcoats. For example, U.S. Pat. No. 4,159,206 discloses a method of improving flexibility by incorporating dialkylsiloxane units through co-condensation of difunctional silane to dilute the crosslinking density of the coating composition. However, the deployment of the difunctional silane is random and cannot be easily controlled. In addition, this reference does not disclose any mechanism to relieve the stress caused by thermoforming. Accordingly, weatherability performance of the coatings disclosed in the patent may be less than desirable since stress is known to reduce coating weatherability.

U.S. Pat. No. 4,914,143 discloses improving the flexibility of the coatings by using colloidal silica having a particle size of no greater than from about 5 to about 10 nanometers. While such coating compositions may provide limited flexibility for more gentle thermoforming applications, they are still not suitable for more demanding applications, for example, those applications that require parts to be bent into smaller radius of curvature. Moreover, the employment of colloidal silica with small particle size also causes the hardcoat to be less resistant to abrasion and marring than might be desired.

U.S. Pat. No. 4,368,235 discloses coating compositions prepared by hydrolyzing an alkyltrialkoxysilane or aryltrialkoxysilane in an aqueous colloidal silica dispersion and adding to the resultant hydrolysis product a linear functionally terminated oligomeric siloxane. However, the flexibility improvement of the coatings is moderate, thus the coating composition disclosed in U.S. Pat. No. '235 may not be suitable for demanding thermoforming applications.

U.S. Pat. No. 7,482,062 discloses a silicone coating composition comprising a silicone resin which is obtained by cohydrolytic condensation of (A) an organosilicon compound, and (B) an alkoxysilane and/or (C) a fluorine-containing organosilicon compound. The '062 patent does not disclose any necessary parameters to make the disclosed coating compositions suitable for use in applications that involve thermoforming techniques.

As such, it is appreciated that there is still a need for an improved coating composition that is suitable for demanding thermoforming applications. The present invention provides an answer to that need.

SUMMARY

In one aspect, the present invention relates to a coating composition suitable for providing a thermoformable hardcoat comprising: (A) at least one silane-containing oligomer selected from the group consisting of: (i) a one compound having the general formula (1)

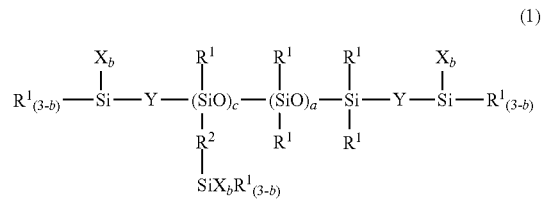

(1)

wherein each occurrence of $R^1$ is independently a C1-C8 alkyl or C6-C20 aryl; each occurrence of $R^2$ is independently a C2-C8 alkylene; each occurrence of X is independently a halogen atom, C1-C6 alkoxy, C1-C6 acyloxy, C1-C6 alkenoxy or hydroxide; each occurrence of Y is independently an oxygen or $R^2$; a is an integer between 0 and 30; b is 2 or 3 and c is an integer between 0 and 6, and/or a partial hydrolytic condensate thereof;

(ii) a copolymer of $CR^1R^1$=$CR^1C(O)OR^1$ and $CR^1R^1$=$CR^1C(O)OR^2SiX_dR^1_{(3-d)}$, wherein each occurrence of $R^1$ is independently a C1-C8 alkyl or C6-C20 aryl; each occurrence of $R^2$ is independently a C2-C8 alkylene; each occurrence of X is independently a halogen atom, C1-C6 alkoxy, C1-C6 acyloxy, C1-C6 alkenoxy or hydroxide; and d is 1, 2 or 3; and combinations thereof;

(B) at least one silane having the general formula (2):

$$R^3_e SiX_{(4-e)} \qquad (2)$$

wherein each occurrence of $R^3$ is independently a C1-C8 alkyl, C2-C8 alkenyl or C6-C20 aryl, each occurrence of X is a halogen atom, C1-C6 alkoxy, C1-C6 acyloxy, C1-C6 alkenoxy or hydroxide; e is 0, 1, or 2 and/or a partial hydrolytic condensate thereof;

(C) metal oxide; and (D) condensation catalyst;

wherein components (A), (B) and (C) are hydrolytically condensed in the presence of component (D) to achieve a $T^3$ to $T^2$ ratio of from about 0.3 to about 2.5.

In another aspect, the present invention relates to a coating composition suitable for providing a thermoformable hardcoat comprising: components (A)-(D) as defined above, and an UV absorber that is capable of co-condensing with at least one of components (A)-(C); wherein components (A), (B), (C) and (E) are hydrolytically condensed in the presence of component (D) to achieve a $T^3$ to $T^2$ ratio of from about 0.3 to about 2.5.

In yet another aspect, the present invention relates to an article having at least one surface coated with the hardcoat compositions of the invention. The coating composition can be cured to provide a flexible cured coating having hardness, mar resistance, crack resistance and weather resistance. Advantageously, the cured coating has a $T_g$ below 150° C. and exhibits less than 20% delta haze after 500 cycles of taber abrasion testing according to ASTM D1044. In addition, the coating has greater than 5% strain and exhibits no cracking or delamination after coated article undergoes vibration or cyclic strain loading, for example, greater than 0.34% of compressive or tensile strain.

The article of the invention is suitable for use in glazing applications, or window applications where the coating can be used for thermal control purposes. The article can also be used as a cover for solar cells. When used in glazing applications, the article meets ANSI Z26.1 for automotive glazing applications equal to or less than AS2 requirements.

DETAILED DESCRIPTION

In one embodiment of the invention, there is provided a coating composition suitable for providing a thermoformable hardcoat containing: (A) at least one silane-containing oligomer selected from the group consisting of: (i) a compound having the general formula (1)

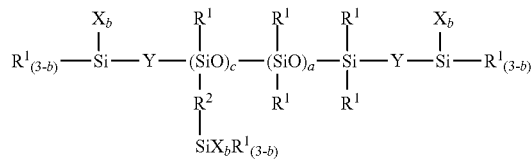

(1)

wherein each occurrence of $R^1$ is independently a C1-C8 alkyl or C6-C20 aryl; each occurrence of $R^2$ is independently a C2-C8 alkylene; each occurrence of X is independently a halogen atom, C1-C6 alkoxy, C1-C6 acyloxy, C1-C6 alkenoxy or hydroxide; each occurrence of Y is independently an oxygen or $R^2$; a is an integer between 0 and 30; b is 2 or 3 and c is an integer between 0 and 6, and/or a partial hydrolytic condensate thereof; (ii) a copolymer of $CR^1R^1\!=\!CR^1C(O)OR^1$ and $CR^1R^1\!=\!CR^1C(O)OR^2SiX_dR^1_{(3-d)}$, wherein each occurrence of $R^1$ is independently a C1-C8 alkyl, or C6-C20 aryl; each occurrence of $R^2$ is independently a C2-C8 alkylene; each occurrence of X is independently a halogen atom, C1-C6 alkoxy, C1-C6 acyloxy, C1-C6 alkenoxy or hydroxide; and d is 1, 2 or 3; and combinations thereof;

(B) at least one silane having the general formula (2):

(2)

wherein each occurrence of $R^3$ is independently a C1-C8 alkyl, C2-C8 alkenyl or C6-C20 aryl, each occurrence of X is a halogen atom, C1-C6 alkoxy, C1-C6 acyloxy, C1-C6 alkenoxy or hydroxide; and e is 0, 1 or 2, and/or a partial hydrolytic condensate thereof;

(C) metal oxide; and (D) condensation catalyst;

wherein components (A), (B) and (C) are hydrolytically condensed in the presence of component (D) to achieve a $T^3$ to $T^2$ ratio of from about 0.3 to about 2.5.

As used herein, "alkyl" includes straight, branched and cyclic alkyl groups. Specific and non-limiting examples of alkyls include, but are not limited to, methyl, ethyl, propyl and isobutyl.

As used herein, "alkenyl" includes any straight, branched, or cyclic alkenyl groups containing one or more carbon-carbon double bonds. Some non-limiting representative examples of alkenyls include vinyl, propenyl, allyl and methallyl.

By "aryl" herein is meant a non-limiting group of any aromatic hydrocarbon from which one hydrogen atom has been removed. An aryl may have one or more aromatic rings, which may be fused, connected by single bonds or other groups. Specific and non-limiting examples of aryls include, but are not limited to, tolyl, xylyl, phenyl and naphthalenyl.

By "alkylene" herein is meant a saturated branched or unbranched aliphatic alkylene; illustratively, an alkanediyl functional group. Examples of alkylene groups are 1,2-ethanediyl, 1,3-propanediyl, 1,4-butanediyl, and 1-methyl-1, 2-ethanediyl.

Alkoxy groups have their usual meaning and can include but are not limited to methoxy, ethoxy, propoxy, isopropoxy, butoxy, phenoxy and benzyloxy.

By "acyloxy" is meant a univalent radical R—COO—, derived from a carboxylic acid such as acetoxy $CH_3COO$—. Preferably, R is C1-C6 hydrocarbon.

By "alkenoxy" is meant a unsaturated branched or unbranched aliphatic alcoholic radical such as —O—CH=$CH_2$, —O—C($CH_3$)=$CH_3$, —O—$CH_2$—CH=$CH_2$.

By "hydrolytically condensed" is meant one or more components of the coating composition are first hydrolyzed, followed by the condensation reaction with itself or other hydrolyzed and/or unhydrolyzed components of the coating composition.

By $T^3/T^2$ herein is meant the relative abundance of RSi*$(OSi)_3$ ($T^3$) versus RSi*$(OSi)_2$OR' ($T^2$) where R is a saturated or unsaturated aliphatic radical or an aromatic radical, R' is H, a saturated or unsaturated aliphatic radical or an aromatic radical. A larger $T^3/T^2$ value indicates a higher degree of condensation. When R is an alkyl group, the chemical shifts of $T^2$ and $T^3$ can be measured at about −58 and −67 ppm respectively with $^{29}$Si NMR. When R is a vinyl or aryl group, the chemical shifts for $T^2$ and $T^3$ are at about −68 and −77 ppm respectively.

Component (A) of the coating composition can be a silane-containing oligomer selected from the group consisting of a silicone based oligomer having formula (1), an organic based oligomer, and combinations thereof. In one embodiment, component (A) is a silicone based oligomer. The silicone based oligomer can be linear when c is zero, or branched when c is greater than 0. Preferably, the silicone based oligomer has a chain length that is long enough to provide necessary flexibility to the cured composition, but not too long to harm the compatibility of the oligomer with other components of the coating composition. In connection with formula (1), preferably, $R^1$ is a C1-C5 alkyl and X is a C1-C4 alkoxy and a is from 1 to 6.

The organic based oligomer, which is either used alone or in combination with a compound of formula (1) as component (A), is a copolymer of monomer (A): $CR^1R^1$=$CR^1C(O)OR^1$ and monomer (B): $CR^1R^1$=$CR^1C(O)OR^2SiX_dR^1_{(3-d)}$, where d is 1, 2 or 3 and $R^1$, $R^2$ and X are the same as defined above in connection with formula (1).

Monomer (A) is preferably methyl methacrylate, methyl acrylate, ethyl methacrylate, ethyl acrylate, butyl methacrylate or butyl acrylate, more preferably methyl methacrylate or methyl acrylate. Preferred monomer (B) is gamma-methacryloxypropyltrimethoxysilane or gamma-methacryloxypropylmethyldimethoxysilane. The ratio of monomer (A) to monomer (B) is from about 1 to about 30 and preferably from about 8 to about 18. The copolymer can be prepared by radical polymerization in the presence of a suitable initiator with heat or ultraviolet irradiation or other method that is known to a person skilled in the field.

Component (B) of the hardcoat composition can be a silane having the general formula $R^3_eSiX_{(4-e)}$(2), wherein each occurrence of $R^3$ is independently a C1-C8 alkyl, C2-C8 alkenyl or C6-C20 aryl, each occurrence of X is independently a halogen atom, C1-C6 alkoxy, C1-C6 acyloxy, C1-C6 alkenoxy or hydroxide; and e is 0, 1 or 2. In a preferred embodiment, $R^3$ is a C1-C5 alkyl, X is a C1-C6 alkoxy group. Representative and non-limiting examples of component (B) include methyltrimethoxysilane, methyltriethoxysilane, ethyltrimethoxysilane, ethyltriethoxysilane, propyltrimethoxysilane, propyltriethoxysilane, hexyltrimethoxysilane, hexyltriethoxysilane, octyltrimethoxysilane, octyltriethoxysilane, vinyltrimethoxysilane, vinyltriethoxysilane, phenyltrimethoxysilane, phenyltriethoxysilane.

Component (C) of the coating composition is a metal oxide, which includes, but is not limited to, silica, alumina, titania, ceria, tin oxide, zirconia, antimony oxide, indium oxide, iron oxide, titania doped with iron oxide and/or zirconia, rare earth oxides, and mixtures and complex oxides thereof. Colloidal dispersions of such metal oxides in powder form may also be used. Alternatively, metal oxides in powder form may be dispersed in the silicone coating compositions.

The preferred metal oxide is colloidal silica. The aqueous dispersions of colloidal silica which can be utilized in the present invention have an average particle size ranging from 2-150 nm and preferably from 5-30 nm. Such dispersions are known in the art; and commercially available ones include, for example, those under the trademarks of LUDOX® (DuPont), SNOWTEX® (Nissan Chemical), and BINDZIL® (Akzo Nobel) and NALCOAG® (Nalco Chemical Company). Such dispersions are available in the form of acidic and basic hydrosols.

Both acidic and basic colloidal silica can be used in the present invention. Colloidal silica having a low alkali content provide a more stable coating composition, and therefore, are preferred. Particularly preferred colloidal silica includes NALCOAG® 1034A, sold by Nalco Chemical Company and SNOWTEX® O40, SNOWTEX® OL-40 sold by Nissan Chemical.

Component (D) of the coating composition is a condensation catalyst which promotes the condensation of completely or partially hydrolyzed components (A), (B) and (C) of the coating composition. The cure catalyst is not particularly limited. Preferably, component (D) is a thermal cure catalyst tetrabutylammonium carboxylate of the formula (3): $[(C_4H_9)_4N]^+[OC(O)-R]^-$, wherein R is selected from the group consisting of hydrogen, alkyl groups containing about 1 to about 8 carbon atoms, and aromatic groups containing about 6 to 20 carbon atoms. In preferred embodiments, R is a group containing about 1 to 4 carbon atoms, such as methyl, ethyl, propyl, butyl, and isobutyl. Exemplary catalysts of formula (3) are tetra-n-butylammonium acetate (TBAA), tetra-n-butylammonium formate, tetra-n-butylammonium benzoate, tetra-n-butylammonium-2-ethylhexanoate, tetra-n-butylammonium-p-ethylbenzoate, and tetra-n-butylammonium propionate. In terms of effectiveness and suitability for the present invention, the preferred condensation catalysts are tetra-n-butylammonium acetate and tetra-n-butylammonium formate, with tetra-n-butylammonium acetate being most preferred.

The composition of the invention can also include surfactants as leveling agents. Examples of suitable surfactants include fluorinated surfactants such as FLUORAD from 3M Company of St. Paul, Minn., and silicone polyethers under the designation Silwet® and CoatOSil® available from Momentive Performance Materials, Inc. of Albany, N.Y. and BYK available from BYK Chemie USA of Wallingford, Conn.

The composition can also include UV absorbers such as benzotriazoles. Preferred UV absorbers are those capable of co-condensing with silanes. Such UV absorbers are disclosed in U.S. Pat. Nos. 4,863,520, 4,374,674, 4,680,232, and 5,391,795 which are herein incorporated by reference in their entireties. Specific examples include 4-[gamma-(trimethoxysilyl) propoxyl]-2-hydroxy benzophenone and 4-[gamma-(triethoxysilyl) propoxyl]-2-hydroxy benzophenone and 4,6-dibenzoyl-2-(3-triethoxysilylpropyl) resorcinol. When the preferred UV absorbers that are capable of co-condensing with silanes are used, it is important that the UV absorber co-condenses with other reacting species by thoroughly mixing the coating composition before applying it to a substrate. Co-condensing the UV absorber prevents coating performance loss caused by the leaching of free UV absorbers to the environment during weathering.

The composition can also include antioxidants such as hindered phenols (e.g. IRGANOX® 1010 from Ciba Specialty Chemicals), dyes (e.g. methylene green, methylene blue and the like), fillers and other additives.

The coating compositions of the invention can be prepared by mixing components (A)-(C), followed by the hydrolytic condensation, which involves the hydrolysis of components (A) and (B) and the condensation of component (C) with hydrolyzed components (A) and (B). Further condensation of the mixture is allowed in the presence of component (D).

In one embodiment, component (A) is first mixed with component (B), a solvent, and optionally a hydrolysis catalyst to provide a mixture. Then component (C) is added slowly to the mixture while mixing. The mixing is continued for a few hours, then component (D) and optional additives such as leveling agents are added to allow further condensation of the mixture. After the degree of the condensation reaches the desired level, the pH and solid content of the mixture can be adjusted to provide a coating composition of the invention.

UV absorbers can be incorporated into the coating composition at any point during the hydrolytic condensation reaction. When a UV absorber that is capable of co-condensing with silanes is used, mixing this UV absorber with components (A) and (B) at the beginning of the process allows it to fully co-condense with other reacting components.

Solvents used for the hydrolytic condensation reaction are usually alcohols, such as methanol, ethanol, propanol, isopropanol, n-butanol, tert-butanol, methoxypropanol, ethylene glycol, diethylene glycol butyl ether, or combinations thereof. Other water miscible organic solvents such as acetone, methyl ethyl ketone, ethylene glycol monopropyl ether, and 2-butoxy ethanol, can also be utilized. Typically, these solvents are used in combination with water.

The temperature for the hydrolysis reaction is generally kept in the range of from about 20° C. to about 50° C., and preferably below 40° C. As a general rule, the longer the reaction time permitted for hydrolysis, the higher the final viscosity.

If necessary, a hydrolysis catalyst may be present during the hydroxylation process. In one embodiment, the hydrolysis catalyst is an acid. Suitable acids include hydrochloric, acetic, chloroacetic, citric, phenylacetic, formic, propionic, glycolic, malonic, toluenesulfonic, and oxalic. The catalyst can be used undiluted or in the form of an aqueous solution.

In one embodiment, silanols, $R^3Si(OH)_3$ and $(HO)_2Si(R^1)O(Si(R^1)_2O)_aOSi(R^1)(OH)_2$, are formed in situ as a result of admixing the corresponding organotrialkoxysilanes and diacetoxy terminated silicone oligomer with the aqueous dispersion of colloidal silica. Alkoxy and acyloxy functional groups, such as methoxy, ethoxy, isopropoxy, n-butoxy, acetoxy and the like generate the hydroxy functional group upon hydrolysis and liberate the corresponding alcohol and carboxylic acid, such as methanol, ethanol, isopropanol, n-butanol, acetic acid and the like.

Upon generating the hydroxyl substituents of these silanols, a condensation reaction begins to form silicon-oxygen-silicon bonds. This condensation reaction is not exhaustive. The siloxanes produced retain a quantity of silicon-bonded hydroxy groups, which is why the polymer is soluble in the water-alcohol solvent mixture. This soluble partial condensate can be characterized as a siloxanol polymer having silicon-bonded hydroxyl groups and —SiO— repeating units.

To make a coating composition suitable for thermoforming applications, it is important to control the reaction to ensure that not all of the hydrolyzable or hydroxyl groups of the organosilane are hydrolytically condensed. The condensation is normally carried out in the presence of a catalyst. The degree of condensation is characterized by the $T^3/T^2$. Suitable $T^3/T^2$ ratios are in the range of from about 0.3 to about 2.5, preferably from about 0.3 to about 2.0. When the ratio is too low, the coatings are either not wettable and therefore hazy or not flexible enough for demanding thermoforming applications. When the ratio is too high, the coatings are less resistant to mar and abrasion. The $T^3/T^2$ ratio can be monitored by $^{29}Si$ NMR. A high $T^3/T^2$ ratio indicates a high level of condensation.

After the $T^3/T^2$ ratio reaches the desired value, the solids content of the coating compositions is typically adjusted by adding alcohol to the reaction mixture. Suitable alcohols include lower aliphatics, e.g., having 1 to 6 carbon atoms, such as methanol, ethanol, propanol, isopropanol, butyl alcohol, t-butyl alcohol, methoxy propanol and the like, or mixtures thereof. A solvent system i.e., mixture of water and alcohol, preferably contains from about 20-75% by weight of the alcohol to ensure that the partial condensate is soluble.

Optionally, additional water-miscible polar solvents, such as diacetone alcohol, butyl cellosolve, and the like can be included in minor amounts, usually no more than 20% by weight of the solvent system.

After adjustment with solvent, the coating compositions of this invention preferably contain from about 10-50% by weight solids, most preferably, about 20% by weight of the total composition. The nonvolatile solid portion of the coating formulation is a mixture of colloidal silica and the partial condensate of silanol. In the preferred coating compositions herein, the partial condensate is present in an amount of from about 40-75% by weight of total solids, with the colloidal silica being present in the amount of from about 25-60% by weight based on the total weight of the solids within the alcohol/water co-solvent.

The coating compositions of this invention preferably have a pH in the range of from about 4 to 7 and most preferably from about 5 to 6. After the hydrolytic condensation reaction, it may be necessary to adjust the pH of the composition to fall within these ranges. To increase the pH value, volatile bases, such as ammonium hydroxide, are preferred. To lower the pH value, volatile acids, such as acetic acid and formic acid, are preferred.

Alternatively, the coating compositions of the invention can be prepared by post addition of the oligomer of component (A) to a silicone thermal hardcoat composition, such as AS4000, AS4700, and SHC5020 from Momentive Performance Materials, Inc. of Albany, N.Y. When this preparation method is chosen, it is important to allow time for the silane moieties of the oligomers to co-condense with the partially condensed mixture of the silicone hardcoat composition. The pH of the resulting mixture may be further adjusted. An appropriate amount of solvent(s) may also be necessary to adjust solid contents.

The hardcoat compositions of the invention can be suitably coated onto a substrate such as plastic or metal surface with or without the use of a primer. Examples of such plastics include synthetic organic polymeric materials, such as acrylic polymers, for example, poly(methylmethacrylate), and the like; polyesters, for example, poly(ethylene terephthalate), poly(butylenes terephthalate), and the like; polyamides, polyimides, acrylonitrile-styrene copolymer, styrene-acrylonitrile-butadiene terpolymers, polyvinyl chloride, polyethylene, and the like.

Special mention is made of the polycarbonates, such as those polycarbonates known as LEXAN® polycarbonate resin, available from SABIC Innovative Plastics, including transparent panels made of such materials. The compositions of this invention are especially useful as protective coatings on the surfaces of such articles.

Once the coating composition of the invention is coated on a substrate, it is allowed to dry by removal of any solvents, for example by evaporation, thereby leaving a dry coating.

The coating composition can subsequently be cured at a temperature of from about 160° C. to about 180° C. to provide a cured coating. Alternatively, the coating composition can be pre-cured before it is fully cured. In one embodiment, both the pre-cured coating and the cured coating have a $T_g$ of less than about 150° C.

If a thermoforming process is desired, it is advantageous to pre-cure the coating composition. In a pre-curing step, the air-dried coating is subjected to slightly elevated temperature with relatively short exposure time to provide a pre-cured coating. It has been surprisingly found that an appropriate pre-curing prevents micro-cracking during thermoforming while maintaining abrasion resistance performance of the coating. As a comparison, when the coating is fully cured at typical curing conditions for 1 hour or longer at 125° C., the coating cracks during thermoforming applications.

A suitable pre-curing condition can be determined by subjecting the coated articles to various pre-curing temperatures for various durations, and then thermoforming the parts at from about 100° C. to about 300° C. for 5 to 30 minutes, preferably at from about 150-180° C. for to 30 minutes. An optimized condition is selected when the thermoformed parts do not have any micro-cracking while at the same time exhibit a superior taber abrasion resistance. Once the coated substrate is pre-cured at such a condition, the substrate will have a coating which is hard enough to provide sufficient mechanical integrity and abrasion resistance for normal handling, but is still flexible enough to permit the coated sheet to be cut, embossed, or thermoformed into predetermined shapes without the development of cracks or fissures in the coating.

Suitable pre-curing conditions are dependent on the coating compositions. A preferred pre-curing condition is to heat the coated substrate at 50 to 100° C. for about 10 to about 60 minutes. The more preferred pre-curing condition is to heat the coated substrate at 60 to 90° C. for about 10 to about 60 minutes, preferably from 15 to 60 minutes.

For thermoforming applications, after the pre-curing step, the coated substrate is first cooled to ambient temperature, then heated to a setpoint, for example, from about 160° C. to about 180° C., by any means known to a person skilled in the art, such as by using an oven. Once the setpoint is reached, the hard coated substrate is then molded to provide an article having a cured coating.

The present invention can be used in many applications. Since the cured coating exhibits high flexibility and is capable of stretch to high degree, the composition is useful in hard-coating film products made of thermoplastics such as polycarbonate, polymethyl methacrylate, polyethylene terephthalate, polypropylene, polyethylene, polystyrene, etc. Such hardcoated films can find uses in applications including but are not limited to thermal control window treatments and solar reflector films used in solar concentrators in outdoor applications and consumer electronics and household appliances in indoor applications.

Typical thermoplastic substrates and primers, which are also typically thermoplastics in nature, have much higher coefficient of thermal expansion (CTE) than the highly crosslinked hardcoats. When coated substrate is subjected to temperature change, stress is created between the thermoplastic substrate or the primer and the hardcoat due to the difference in CTE. The stress caused by CTE mismatch often generates micro-cracking which, in turn, often creates catastrophic failure in weathering. The improved flexibility of the hardcoat according to the current invention provides a better match in the CTE between hardcoat and underlining thermoplastics or primers and, in turn, minimizing micro-cracking while weathering.

The improved flexibility can also find applications in glazing of objects constantly experiencing vibration such as automobile windows and windshields, auto bodies, sunroofs, motorcycle windshields and bodies, boats, and aircrafts, etc.

The following examples are illustrative and not to be construed as limiting of the invention as disclosed and claimed herein. All parts and percentages are by weight and all temperatures are degrees Celsius unless explicitly stated otherwise. All patent applications, patents and other publications cited herein are incorporated by reference in their entirety.

EXAMPLES

A brief description of the tests utilized in some or all of the following examples will now be given.

Unless otherwise described, the coated sheets were prepared by applying the coating compositions specified in the examples below onto one side of 5 or 10 mil polycarbonate sheets having a width of about 2 inches and a length of about 10 inches for flexibility measurement or 1/8 inch polycarbonate panels having a width of about 4 inches and length of about 6 inches for taber abrasion evaluation. The coatings were subsequently cured.

Coating Thickness Measurement:

The thickness of the cured coatings was measured using Filmetrics F20 thin-film analyzer calibrated with a BK-7 sample.

Strain (or Flexibility)

To subject the coatings to different bending stresses, the coated sheets were wrapped around various metal tubes having a radius ("r") ranging from 1.6 mm to 11 mm. The coatings were then examined for micro-cracking. For the coatings where no cracking was observed, the strain was calculated based on the formula strain=100%·h/r using the thickness ("h") of the coating and the smallest possible r value of the metal tube. Larger strain values indicate better flexibility.

Taber Abrasion Measurement:

Taber abrasion was measured according to ASTM D-1044 using 5130 Abraser from Taber Industries with CS-10F wheel and 500 g load. The abrasion resistance was determined by the haze change after a predetermined taber cycles. Haze was measured with a BYK Gardner Haze-Gard Plus. Low delta haze indicates good abrasion resistance.

Examples 1

Flexible Hardcoat Made with a Silane-Containing Organic Oligomer

A container was charged with 120 g of AS 4000 silicone hardcoat (Momentive Performance Materials Inc., a partial condensate of methyltrimethoxysilane, colloidal silica, and silylated hydroxybenzophenone with water and alcoholic co-solvents) and 120 g of SS4179 (Momentive Performance Materials Inc., copolymer of methyl methacrylate and methyl methacryloxypropyltrimethoxysilane in acetic acid). A small amount of thermal catalyst (0.101 g, TBAA catalyst solution containing 40% tetrabutylammonium acetate in water) and 2.67 g of silylated UV absorbent, 4-[gamma-(triethoxysilyl) propoxyl]-2-hydroxy benzophenone (SHBP), were subsequently added while mixing. The pH of the mixture was then adjusted with 0.5 g of 0.7 M aqueous solution of ammonium hydroxide to provide a coating composition.

The coating was coated onto a 5 mil polycarbonate film and a 1/8 inch polycarbonate sheet and cured at 125° C. for 1 hour for strain and taber abrasion measurements. AS4000 alone was also coated onto a polycarbonate film for comparison purposes. The results are shown in Table 1.

As shown in Table 1, the addition of SS4179 improves flexibility of the coating as indicated by the increase of strain while at the same time maintaining the taber abrasion resistance.

Examples 2 and 3

More Flexible Hardcoat Compositions Made with a Silane-Containing Oligomer

The same procedure as described in Example 1 was followed except a different type of silicone hardcoat, AS4010 (a partial condensate of methyltrimethoxysilane, colloidal silica, and silylated dibenzoresorcinol with water and alcoholic co-solvents, available from Momentive Performance Materials Inc.) and UV absorber, 4,6-dibenzoyl-2-(3-triethoxysilylpropyl) resorcinol (SDBR) were used. In addition, acetic acid was used to adjust the pH. The exact amounts of the components are shown in Table 1.

Coatings were applied to 5 mil polycarbonate films and 1/8 inch polycarbonate sheets and cured at 125° C. for 1 hour to measure strain and abrasion resistance. AS4010 alone was also coated for comparison purposes. The results are shown in Table 1. Again, while the taber abrasion was largely unchanged, the flexibility of the SS4179 containing coatings was increased.

TABLE 1

|  | Example 1 | Example 2 | Example 3 | AS4000 | AS4010 |
|---|---|---|---|---|---|
| AS4000 | 120 |  |  |  |  |
| AS4010 |  | 120 | 180 |  |  |
| SS4179 | 120 | 120 | 90 |  |  |
| TBAA Catalyst solution | 0.101 | 0.101 | 0.076 |  |  |
| SHBP | 2.67 |  |  |  |  |
| 33.3% SDBR in methoxypropanol |  | 8.86 | 10.30 |  |  |
| acetic acid |  | 9.5 | 7.3 |  |  |
| 0.7M aqueous ammonium hydroxide | 0.5 |  |  |  |  |
| Total | 243.2 | 258.5 | 287.7 |  |  |
| Coating thickness, micron | 5.12 | 3.58 | 4.92 | 4.88 | 5.39 |
| strain, % | 5.2 | 6.6 | 4.2 | 2.3 | 2.2 |
| Taber abrasion resistance |  |  |  |  |  |
| initial haze | 0.42 | 0.67 | 0.47 | 0.7 | 0.72 |
| Delta haze after 100 cycles | 1.26 | 2.4 | 1.16 | 0.82 | 0.73 |
| Delta haze after 500 cycles | 1.67 | 2.76 | 1.28 | 1.91 | 2.25 |
| Adhesion to polycarbonate* | 5B |  |  | 0B | 0B |

*Adhesion measured according to ASTM D3359.

Examples 4-12

Thermoformable Hardcoat Compositions

More coating compositions according to the present invention and their performance are shown in Table 2. All coatings of examples 4-12 were cured at 88° C. for 1 hr.

TABLE 2

|  | Example 4 | Example 5 | Example 6 | Example 7 | Example 8 | Example 9 | Example 10 | Example 11 | Example 12 |
|---|---|---|---|---|---|---|---|---|---|
| AS4000 |  |  |  | 20 | 30 | 40 |  |  |  |
| AS4700[1] | 20 | 30 | 40 |  |  |  |  |  |  |
| AS4010 |  |  |  |  |  |  | 20 | 30 | 40 |
| SS4179 | 20 | 15 | 10 | 20 | 15 | 10 | 20 | 15 | 10 |
| TBAA Catalyst solution | 0.375 | 0.56 | 0.75 | 0.375 | 0.56 | 0.75 | 0.375 | 0.56 | 0.75 |
| total | 40.4 | 45.6 | 50.8 | 40.4 | 45.6 | 50.8 | 40.4 | 45.6 | 50.8 |
| Strain, % | 5.2 | 4.2 | 3.7 | 4.2 | 3.7 | 3.7 | >9% | >9% | 6.6 |
| Taber abrasion resistance |  |  |  |  |  |  |  |  |  |
| Initial haze | 0.73 | 0.58 | 0.5 | 4.28 | 1.06 | 0.76 | 1.08 | 0.76 | 1.28 |
| delta haze after 100 cycles | 1.85 | 0.77 | 2.48 | 0.73 | 1.72 | 0.25 | 5.34 | 2.67 | 0.46 |
| delta haze after 500 cycles, % | 4.59 | 2.52 | 4.86 | 4.49 | 6.06 | 4 | 8.4 | 10.34 | 4.16 |
| Adhesion[2] to polycarbonate | 5B | 5B | 5B | 5B | 5B | 5B | 4B | 0B | 0B |

[1]AS 4700 is a partial condensate of methyltrimethoxysilane, colloidal silica, and silylated dibenzoresorcinol with water and alcoholic co-solvents, available from Momentive Performance Materials Inc.
[2]Adhesion measured according to ASTM D3359.

Example 13

Preparation of Organosilane Terminated Silicone Oligomer

A beaker equipped with a magnetic stirrer was charged with 56.5 g of methyltriacetoxysilane. To this was added 43.5 g of silanol terminated polydimethylsiloxane having an average molecular weight of about 610 daltons. The addition rate was controlled so that the temperature of the reaction medium was maintained below 40° C. After the addition was completed, the clear reaction solution was allowed to cool to room temperature before it was used in the preparation of thermoformable hardcoat.

Examples 14-24

Preparation of Thermoformable Hardcoat Composition

Various solvents and colloidal silica from various manufacturers were used in the preparation of the thermoformable hardcoat composition. The preparations generally followed the procedure described below:

A container was charged with the oligomer of Example 13, followed by the addition of methyltrimethoxysilane, and aliphatic alcohol solvent(s), such as methoxypropanol, n-butanol, and isopropanol, under ambient conditions. The reaction mixture was stirred at room temperature for about 10 minutes. Then an aqueous solution of a colloidal silica, such as Nalcoag® 1034A from Nalco Chemical, Ludox® AS40 from Du Pont, Snowtex® O40 from Nissan Chemical, was added slowly to the reaction mixture. The addition rate of the colloidal silica was controlled so that the reaction temperature did not rise above 40° C. Once the addition of colloidal silica was completed, the mixture was stirred for about 16 hours at room temperature. Then the thermal catalyst TBAA was added, followed by the silylated dibenzyolresorcinol (SDBR), and the leveling agent BYK 302 from BYK. After an additional 5 minutes of mixing, the pH of the reaction mixture was adjusted with aqueous ammonium hydroxide solution or acetic acid to about 5.5. The pH-adjusted mixture was then stored in a 45° C. oven to age for 5 days before coating. The level of the condensation was monitored with $^{29}$Si NMR to determine the $T^3/T^2$ ratio. When a proper $T^3/T^2$ was reached, the hardcoat composition was ready for coating.

The coatings were coated onto 10 mil polycarbonate films and ⅛ inch thick polycarbonate sheets and were cured at 125° C. for 1 hour. Strain and taber abrasion resistance were measured and the results are shown in Table 3. The results indicate the hardcoats of the invention exhibit improved flexibility as indicated by the high strain data while at the same time maintaining performance of abrasion and mar resistance as indicated by the low delta haze after 500 cycles of abrasion using CS-10F wheel with 500 g load according to ASTM D-1044.

allowed to evaporate for 10 minutes under ambient conditions. The hardcoat was then coated onto the primer by flowcoating; and the solvents were allowed to evaporate under ambient conditions for 10 minutes. The polycarbonate sheet was primed and hardcoated on both sides.

The air-dried sheets were then pre-cured at 60° C. or 80° C. for 15, 30 or 60 minutes (details are shown in Table 4). These pre-cured sheets were then cooled to ambient temperature and transferred to the final forming process.

In the forming step, the coated sheets were heated to 160-175° C. between two heated platens or in an oven. The sheets were then held at a temperature until it equilibrated to the setpoint of 165° C. The forming time can range from 5-10 minutes. After the target temperature was achieved, the sheets were immediately transferred to a forming mold where they were draped over or into the mold to obtain articles having the desired final shape. The articles cooled in the mold until they could be removed without reforming due to their own weight. The thermoformed parts were then examined for microcracking. The results are shown in Table 4.

TABLE 3

| | Example 14 | Example 15 | Example 16 | Example 17 | Example 18 | Example 19 | Example 20 | Example 21 | Example 22 | Example 23 | Example 24 |
|---|---|---|---|---|---|---|---|---|---|---|---|
| Oligomer of Example 13 | 18 | 24.3 | 30 | 33 | 17.83 | 17.38 | 17.83 | 17.83 | 54 | 100.8 | 67.2 |
| methyltrimethoxysilane | 67.5 | 56.1 | 55.1 | 46 | 33.75 | 32.88 | 33.75 | 33.75 | 202.5 | 185.04 | 77.28 |
| methoxypropanol | 235.1 | 234.63 | 237.45 | 237.45 | 182.30 | 185.35 | 91.15 | | 804 | 1075.2 | 564 |
| n-butanol | | | | | | | | 91.15 | | | |
| isopropanol | | | | | | | 91.15 | 91.15 | | | |
| Nalcoag 1034A | 89.16 | 89.16 | 89.16 | 89.16 | 53.30 | | 53.30 | 53.30 | | | |
| Ludox AS 40 | | | | | | 43.94 | | | | | |
| Snowtex O40 | | | | | | | | | 227.4 | 254.8 | 128.8 |
| acetic acid | | | | | | 14.72 | | | | | |
| TBAA catalyst solution | 0.96 | 1.05 | 0.93 | 0.93 | 0.42 | 0.39 | 0.42 | 0.65 | 1.71 | 2.28 | 1.16 |
| 33.3% SDBR in methoxypropanol | 8.22 | 8.22 | 8.22 | 8.22 | 17.99 | 17.53 | 17.99 | 17.99 | 60 | 101.64 | 52.02 |
| BYK 302 | 0.3 | 0.3 | 0.3 | 0.3 | 0.18 | 0.18 | 0.18 | 0.18 | 0.78 | 1.036 | 0.53 |
| 0.7M NH$_4$OH(aq) | 1.76 | 4.95 | 5.75 | 5.75 | 3.10 | 19.50 | | | 11.06 | 13.44 | 13.39 |
| 8.64% NH$_4$OH(aq) | | | | | 0.77 | 6.14 | 0.80 | 1.07 | | | |
| Total | 418.94 | 413.46 | 420.86 | 414.76 | 309.64 | 338.01 | 306.57 | 307.07 | 1349.61 | 1719.76 | 890.46 |
| $T^3/T^2$ | | | | | 1.01 | 2.24 | 0.79 | 0.86 | 0.93 | 0.75 | 0.83 |
| Strain, % | 4.7 | 6.5 | 7.4 | 7.4 | 9.3 | 9.3 | 9.3 | 11.8 | 5.8 | 6.5 | 6.5 |
| Taber abrasion | | | | | | | | | | | |
| initial haze, % | 0.54 | 0.74 | 0.56 | 0.46 | 0.43 | 0.58 | 0.53 | 0.4 | 0.69 | 0.75 | 1.11 |
| delta haze after 100 cycles, % | 2.46 | 2.54 | 6.28 | 5.17 | 1.5 | 2.35 | 2.71 | 2.67 | 3.17 | 7.26 | 7.38 |
| delta haze after 500 cycles, % | 7.34 | 12.66 | 20.24 | 16.34 | 5.42 | 7.79 | 11.47 | 13 | 11.11 | 11.45 | 12.39 |

Examples 25-30

Thermoforming

Two thermoformable hardcoat compositions as described in Examples 22 and 23 were used to perform thermoforming.

A 12"×16"×⅛" polycarbonate sheet was first primed with a primer (SHP401, an acrylic primer from Momentive Performance Materials Inc.) by flowcoating. Solvents were As shown in Table 4, both hardcoats pass the thermoforming test, although the coating composition of example 22 is less flexible and exhibited small numbers of minute cracks. These cracks only occurred at the very bottom edge of the samples where the coatings withdrew after flowcoating to form an unusually thick edge, a typical phenomenon that normally occurs in flowcoating. Cracking at this part of the sheet is not considered as a defect as the edge will be cut off in the production.

TABLE 4

|  | Example 25 | Example 26 | Example 27 | Example 28 | Example 29 | Example 30 |
|---|---|---|---|---|---|---|
| Primer | SHP401 | SHP401 | SHP401 | SHP401 | SHP401 | SHP401 |
| Hardcoat | Example 22 | Example 22 | Example 22 | Example 23 | Example 23 | Example 23 |
| pre-cure conditions | 60° C., 60 min | 80° C., 15 min | 80° C., 30 min | 60° C., 60 min | 80° C., 15 min | 80° C., 30 min |
| Thermoform results | ½" crack at bottom | ½" crack at bottom | ½" crack at bottom | no cracks | no cracks | no cracks |

Example 31 and Comparative Examples 1-2

Example 31 was made according to current invention, where the silanol-end capped silicone oligomer was mixed with methyltriacetoxy silane to prepare methyldiacetoxysilane endcapped oligomer prior to the addition of methyltrimethoxysilane and solvents.

Comparative examples 1 and 2 were made according to the disclosure of U.S. Pat. No. 4,368,235. In Comparative example 1, the organosilane terminated silicone oligomer was absent since methyltriacetoxysilane was not used. However, 7.67 grams of acetic acid, that would have been generated if the oligomer were made according to Example 13, was added to keep the reaction medium as close to Example 31 as possible.

In Comparative example 2, methyltriacetoxysilane was not added until the silanol polydimethylsiloxane had been mixed with methyltrimethoxysilane, methoxypropanol and isopropanol to minimize endcapping reactions with the silanol oligomer. $^{29}$Si NMR confirmed the existence of a relatively large amount of $M^{OH}$ as uncapped silanol oligomers even after the formulated samples had been aged for 6 days at 45° C.

As can be seen in Table 5, after aging to a comparable $T^3/T^2$, the coatings of both comparative examples, where the silanol oligomer was not converted to multifunctional ends as disclosed in this invention (e.g. Example 31), did not exhibit as high a flexibility as the coating from the current invention, Example 31, as indicated by the relative strain.

TABLE 5

|  | Example 31 | Comparative example 1 | Comparative example 2 |
|---|---|---|---|
| Oligomer (Example 13) | 35.66 | | |
| Silanol stopped PDMS | | 15.50 | 15.50 |
| methyltrimethoxysilane | 67.50 | 79.99 | 67.50 |
| acetic acid | | 7.67 | |
| methoxypropanol | 40.00 | 40.00 | 40.00 |
| IPA | 182.30 | 182.30 | 182.30 |
| Methyltriacetoxysilane | | | 20.16 |
| Nalcoag 1034A | 106.60 | 106.60 | 106.60 |
| TBAA catalyst solution | 0.84 | 0.84 | 0.84 |
| 8.64% NH$_4$OH(aq) | 3.64 | 1.36 | 4.66 |
| SDBR | 35.98 | 35.98 | 35.98 |
| BYK 302 | 0.37 | 0.37 | 0.37 |
| Total | 472.89 | 470.61 | 473.91 |
| % solids | 21.97 | 22.02 | 20.58 |
| Age for 6 days at 45° C. | | | |
| $T^3/T^2$ | 1.21 | 0.93 | 1.51 |
| Strain, % | 9.3 | 3.5 | 5.8 |

Comparative Example 3

This comparative example illustrates the importance of pre-curing for the purposes of making crack-free thermoformed products.

A 12"×12"×⅛" polycarbonate sheet was flowcoated with SHP401 on both sides and dried under ambient conditions for 10 minutes to flash off the solvents. The hardcoat of Example 22 was then flowcoated onto the dried primer layer and the solvents of the hardcoat were flashed under ambient conditions for 10 minutes.

The coated sheet was then cured at a typical curing condition for a silicone hardcoat, 125° C. for 1 hour, instead of the pre-curing conditions according to the disclosed invention. After the cured sheets were cooled to ambient temperature, the same thermoforming as described in Examples 25-30 were performed. The formed parts were found to have numerous large cracks, some of which were up to 10 inches long.

Comparative Example 4

Two commercially available silicone hardcoat products, AS4000 as described above and PHC587 (reaction products of methyltrimethoxysilane, colloidal silica, silylated hydroxy benzophenone and a styrene acrylic polymer with water and alcohols as co-solvents), both from Momentive Performance Materials Inc., were individually coated on polycarbonate substrates as used in the examples above. The coatings were cured at 80° C. for 1 hour. Then thermoforming was performed in the same manner as illustrated in examples 25-30. Large cracks combined with numerous micro-cracking throughout the coatings were found for the articles coated with either S4000 or PHC 587. Moreover, in the case of PHC587, the coating also lost adhesion.

AS4000 and PHC587 were also cured at their recommended cure temperature of 130° C. for 1 hour. Upon thermoforming, the samples showed excessive cracking at curvatures and formed surfaces.

Example 32

Thermoformable Coating Composition

The inventors found that it is important to pre-age the thermoformable hardcoat resins. The aging is monitored with $^{29}$Si NMR by measuring the $T^3/T^2$ ratio. Useable products only exist in a narrow range of the $T^3/T^2$. When $T^3/T^2$ ratio is too low, the coatability is very poor and the coating is very hazy. When the $T^3/T^2$ became too high, the coating lost abrasion resistance and, again, not useable. The following examples demonstrate the aging phenomenon.

Preparation of Thermoformable Coating Composition

In a suitable container was charged 53.49 g of the organosilane terminated silicone oligomer prepared as shown in Example 13, followed by addition of 101.25 g methyltrimethoxysilane, and 546.9 g methoxypropanol under ambient conditions. The reaction mixtures were mixed at an ambient temperature for about 10 minutes. While mixing, 159.9 g of the aqueous solution of colloidal silica, Nalcoag 1034A from Nalco Chemical, was slowly added to the silane mixture. An exotherm due to hydrolysis and condensation was detected. The addition rate of the colloidal silica was controlled so that the reaction temperature did not rise above 40° C. Once the addition of colloidal silica was completed, the mixture was allowed to continue to mix at ambient temperature. After mixing for about 16 hours, 1.26 g of the catalyst TBAA was added, followed by 53.97 g of the silylated dibenzyolresorcinol (SDBR), and 0.55 g of the leveling agent BYK 302 from BYK. After additional 5 minutes mixing, 3.1 g of 8.6% $NH_4OH$ aqueous solution was charged and further mixed for another 10 minutes.

Aging Study:

The above formula was aged by heating in a 45° C. oven for various days. The $T^3/T^2$ ratio was monitored with $^{29}Si$ NMR. The coatings of various levels of aging were coated on ⅛ inch thick polycarbonate sheets and cured at 125° C. for 1 hour to measure taber abrasion resistance according to ASTM D-1044. The detailed results are shown in Table 6.

TABLE 6

Aging study

| $T^3/T^2$ | 0.29 | 0.68 | 1.29 | 1.85 | 1.94 | 2.43 | 2.82 |
|---|---|---|---|---|---|---|---|
| Taber abrasion, % | | | | | | | |
| Initial | 28 | 0.63 | 0.49 | 0.41 | 0.5 | 0.44 | 0.56 |
| Delta haze after 100 cycles | | 7.65 | 2.77 | 4.41 | 5.95 | 6.5 | 9.74 |
| Delta haze after 500 cycles | | 14.27 | 14.41 | 11.89 | 12.1 | 13.06 | 21.64 |

As can be seen on the table, at a low level of aging ($T^3/T^2$=0.29) the coated sample exhibited extremely high haze and the coated surface contained lots of fish-eyes. When $T^3/T^2$ ratio reached 2.82, the delta haze after 100 and 500 cycles of taber abrasion became too high for the coating to be useful.

Aging at higher temperature also exhibited similar results. The results below illustrate similar narrow $T^3/T^2$ requirement; at a $T^3/T^2$ ratio>3, the abrasion resistance of the coatings were dramatically reduced.

| | $T^3/T^2$ | | | |
|---|---|---|---|---|
| Taber abrasion, % | 0.29 | 2.41 | 3.11 | 3.56 |
| initial | 28 | 0.52 | 0.79 | 0.98 |
| Delta haze after 100 cycles | | 5.18 | 8.91 | 11.42 |
| Delta haze after 500 cycles | | 15.28 | 22.91 | 40.12 |

While the invention has been described above with references to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims.

What is claimed is:

1. A coating composition suitable for providing a thermoformable hardcoat comprising:
    (A) at least one silane-containing oligomer having the general formula (1)

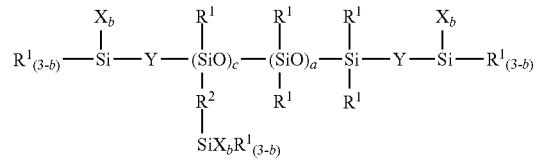

(1)

wherein each occurrence of $R^1$ is independently a C1-C8 alkyl or C6-C20 aryl; each occurrence of $R^2$ is independently a C2-C8 alkylene; each occurrence of X is independently a halogen atom, C1-C6 alkoxy, C1-C6 acyloxy, C1-C6 alkenoxy or hydroxide; each occurrence of Y is independently an oxygen or $R^2$; a is an integer between 0 and 30; b is 2 or 3 and c is an integer between 0 and 6, and/or a partial hydrolytic condensate thereof;
    (B) at least one silane having the general formula (2):

$$R^3_e SiX_{(4-e)} \quad (2)$$

wherein each occurrence of $R^3$ is independently a C1-C8 alkyl, C2-C8 alkenyl or C6-C20 aryl, each occurrence of X is a halogen atom, C1-C6 alkoxy, C1-C6 acyloxy, C1-C6 alkenoxy or hydroxide; e is 0, 1 or 2, and/or a partial hydrolytic condensate thereof;
    (C) metal oxide; and
    (D) condensation catalyst;
    wherein components (A), (B) and (C) are hydrolytically condensed in the presence of component (D) to achieve a $T^3$ to $T^2$ ratio of from about 0.83 to about 2.5.

2. The coating composition of claim 1 wherein in formula (1), each occurrence of $R^1$ is independently a C1-C5 alkyl and each occurrence of X is independently a C1-C4 alkoxy.

3. The coating composition of claim 1 wherein in formula (2), each occurrence of $R^3$ is independently a C1-C5 alkyl, and each occurrence of X is independently a C1-C6 alkoxy group.

4. The coating composition of claim 1 wherein the metal oxide is colloidal silica.

5. The coating composition of claim 1 wherein component (D) is a thermal cure catalyst tetrabutylammonium carboxylate having a structural formula (3)

$$[(C_4H_9)_4N^+[OC(O)\text{—}R]^-, \quad (3),$$

wherein R is selected from the group consisting of hydrogen, alkyl groups containing about 1 to about 8 carbon atoms, and aromatic groups containing about 6 to 20 carbon atoms.

6. The coating composition of claim 5 wherein R is a C1-C4 alkyl.

7. The coating composition of claim 5 wherein component (D) is selected from the group consisting of tetra-n-butylammonium acetate (TBAA), tetra-n-butylammonium formate, tetra-n-butyl ammonium benzoate, tetra-n-butylammonium-2-ethylhexanoate, tetra-n-butylammonium-p-ethylbenzoate, tetra-n-butylammonium propionate and combinations thereof.

8. An article having at least one surface coated with the coating composition of claim 1.

9. The article of claim 8 wherein said surface of said article has first been primed with a primer composition prior to being coated with said coating composition.

10. The article of claim 8 wherein the article comprises a synthetic organic polymer.

11. The article of claim 10 wherein said organic polymer is a polycarbonate.

12. The article of claim 8 wherein said coating composition has been pre-cured on said surface of said article.

13. The article of claim 12 wherein said coating composition has been cured to provide a cured coating on said surface of said article.

14. The article of claim 12 wherein said article has been thermoformed after said pre-curing of said coating composition.

15. The article of claim 12 wherein said article has been thermoformed in the temperature range of from about 100° C. to about 300° C. for 5 to 30 minutes.

16. The article of claim 8 wherein said coating composition has been pre-cured in the temperature range of 60° C. to 90° C. for 15 to 60 minutes.

17. The article of claim 8 wherein said coating composition has been cured to provide a cured coating on said surface of said article.

18. The article of claim 17 wherein said cured coating has a $T_g$ below 150° C. and exhibits less than 20% delta haze after 500 cycles of taber abrasion testing according to ASTM D1044.

19. The article of claim 17 wherein said cured coating exhibits greater than 5% strain and less than 20% delta haze after 500 cycles of taber abrasion testing according to ASTM D1044.

20. The article of claim 17 wherein said article is an automotive glazing that meets ANSI Z26.1 for automotive glazing applications equal to or less than AS2 requirements.

21. The article of claim 17 wherein said cured coating exhibits no cracking or delamination after vibration or cyclic strain loading of said article.

22. The article of claim 8 wherein said article is a window or a solar cell cover.

23. A process for preparing a coated article having a partially cured or fully cured coating comprising the steps of: 1) providing a coating composition according to claim 1 and a substrate, 2) applying said coating composition to said substrate; 3) heating said coating composition to an elevated temperature for a time sufficient to at least partially or fully cure said coating composition, thereby making said coated article having a partially cured or fully cured coating.

24. The process of claim 23 wherein said coating composition is heated at a temperature of from about 60° C. to 90° C. for about 15 to 60 minutes to at least partially cure said coating composition.

25. The process of claim 24 further comprising the steps of heating said article having an at least partially cured coating to a temperature of from about 160° C. to about 180° C. to provide a thermoformable coated article, and forming said thermoformable coated article into a desired shape.

26. The process of claim 23 wherein said coated substrate is heated to a temperature of from about 160° C. to about 180° C. to fully cure said coating composition.

27. The coating composition of claim 1, further comprising a copolymer of $CR^1R^1\!\!=\!\!CR^1C(O)OR^1$ and $CR^1R^1\!\!=\!\!CR^1C(O)OR^2SiX_dR^1{}_{(3-d)}$, wherein each occurrence of $R^1$ is independently a C1-C8 alkyl or C6-C20 aryl; each occurrence of $R^2$ is independently a C2-C8 alkylene; each occurrence of X is independently a halogen atom, C1-C6 alkoxy, C1-C6 acyloxy, C1-C6 alkenoxy or hydroxide; and d is 1, 2 or 3.

28. A coating composition suitable for providing a thermoformable hardcoat comprising:
(A) at least one silane-containing oligomer having the general formula (1)

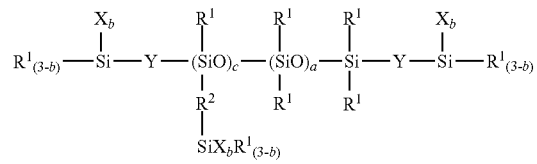

wherein each occurrence of $R^1$ is independently a C1-C8 alkyl or C6-C20 aryl; each occurrence of $R^2$ is independently a C2-C8 alkylene; each occurrence of X is independently a halogen atom, C1-C6 alkoxy, C1-C6 acyloxy, C1-C6 alkenoxy or hydroxide; each occurrence of Y is an oxygen or $R^2$; a is an integer between 0 and 30; b is 2 or 3 and c is an integer between 0 and 6, and/or a partial hydrolytic condensate thereof;
(B) at least one silane having the general formula (2):

wherein each occurrence of $R^3$ is independently a C1-C8 alkyl, C2-C8 alkenyl or C6-C20 aryl, each occurrence of X is a halogen atom, C1-C6 alkoxy, C1-C6 acyloxy, C1-C6 alkenoxy or hydroxide; e is 0, 1 or 2; and/or a partial hydrolytic condensate thereof;
(C) metal oxide; and
(D) condensation catalyst;
(E) a UV absorber that is capable of co-condensing with at least one of components (A), (B) or (C);
wherein components (A), (B), (C) and (E) are hydrolytically condensed in the presence of component (D) to achieve a $T^3$ to $T^2$ ratio of from about 0.83 to about 2.5.

29. The coating composition of claim 28 wherein the UV absorber is selected from the group consisting of 4-[gamma-(trimethoxysilyl) propoxyl]-2-hydroxy benzophenone, 4-[gamma-(triethoxysilyl)propoxyl]-2-hydroxy benzophenone, 4,6-dibenzoyl-2-(3-triethoxysilylpropyl) resorcinol, and combinations thereof.

30. An article having at least one surface coated with the coating composition of claim 28.

31. The coating composition of claim 28, further comprising a copolymer of $CR^1R^1\!\!=\!\!CR^1C(O)OR^1$ and $CR^1R^1\!\!=\!\!CR^1C(O)OR^2SiX_dR^1{}_{(3-d)}$, wherein each occurrence of $R^1$ is independently a C1-C8 alkyl or C6-C20 aryl; each occurrence of $R^2$ is independently a C2-C8 alkylene; each occurrence of X is independently a halogen atom, C1-C6 alkoxy, C1-C6 acyloxy, C1-C6 alkenoxy or hydroxide; and d is 1, 2 or 3.

32. An article comprising:
a substrate having a surface coated with a coating composition suitable for providing a thermoformable hardcoat comprising:
(A) at least one silane-containing oligomer having the general formula (1)

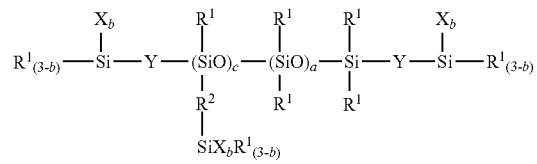

wherein each occurrence of R' is independently a C1-C8 alkyl or C6-C20 aryl; each occurrence of $R^2$ is independently a C2-C8 alkylene; each occurrence of X is independently a halogen atom, C1-C6 alkoxy, C1-C6 acyloxy, C1-C6 alkenoxy or hydroxide; each occurrence of Y is independently an oxygen or $R^2$; a is an integer between 0 and 30; b is 2 or 3 and c is an integer between 0 and 6, and/or a partial hydrolytic condensate thereof;

(ii) a copolymer of $CR^1R^1=CR^1C(O)OR^1$ and $CR^1R^1=CR^1C(O)OR^2SiX_dR^1_{(3-d)}$, wherein each occurrence of $R^1$ is independently a C1-C8 alkyl or C6-C20 aryl; each occurrence of $R^2$ is independently a C2-C8 alkylene; each occurrence of X is independently a halogen atom, C1-C6 alkoxy, C1-C6 acyloxy, C1-C6 alkenoxy or hydroxide; and d is 1, 2 or 3; and combinations thereof;

(B) at least one silane having the general formula (2):

wherein each occurrence of $R^3$ is independently a C1-C8 alkyl, C2-C8 alkenyl or C6-C20 aryl, each occurrence of X is a halogen atom, C1-C6 alkoxy, C1-C6 acyloxy, C1-C6 alkenoxy or hydroxide; e is 0, 1 or 2, and/or a partial hydrolytic condensate thereof;

(C) metal oxide; and
(D) condensation catalyst;
wherein components (A), (B) and (C) are hydrolytically condensed in the presence of component (D) to achieve a $T^3$ to $T^2$ ratio of from about 0.83 to about 2.5,
wherein said coating composition has been pre-cured for about 10 minutes to about 60 minutes at a temperature of from about 60° C. to about 90° C. and wherein said pre-cured coating composition is cooled to ambient temperature and then fully cured at a temperature of from about 160° C. to about 180° C.

33. The coating composition of claim 32 wherein in formula (1), each occurrence of $R^1$ is independently a C1-C5 alkyl and each occurrence of X is independently a C1-C4 alkoxy.

34. The coating composition of claim 32 wherein in formula (2), each occurrence of $R^3$ is independently a C1-C5 alkyl, and each occurrence of X is independently a C1-C6 alkoxy group.

35. The coating composition of claim 32 wherein the metal oxide is colloidal silica.

36. The coating composition of claim 32 wherein component (D) is a thermal cure catalyst tetrabutylammonium carboxylate having a structural formula (3)

$$[(C_4H_9)_4N^+[OC(O)-R]^- \quad (3),$$

wherein R is selected from the group consisting of hydrogen, alkyl groups containing about 1 to about 8 carbon atoms, and aromatic groups containing about 6 to 20 carbon atoms.

37. The coating composition of claim 36 wherein R is a C1-C4 alkyl.

38. The coating composition of claim 36 wherein component (D) is selected from the group consisting of tetra-n-butylammonium acetate (TBAA), tetra-n-butylammonium formate, tetra-n-butyl ammonium benzoate, tetra-n-butylammonium-2-ethylhexanoate, tetra-n-butylammonium-p-ethylbenzoate, tetra-n-butylammonium propionate and combinations thereof.

39. An article comprising:
a substrate having a surface coated with a coating composition suitable for providing a thermoformable hardcoat comprising:
(A) at least one silane-containing oligomer having the general formula (1)

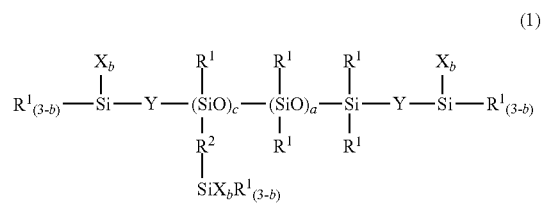

wherein each occurrence of R' is independently a C1-C8 alkyl or C6-C20 aryl; each occurrence of $R^2$ is independently a C2-C8 alkylene; each occurrence of X is independently a halogen atom, C1-C6 alkoxy, C1-C6 acyloxy, C1-C6 alkenoxy or hydroxide; each occurrence of Y is independently an oxygen or $R^2$; a is an integer between 0 and 30; b is 2 or 3 and c is an integer between 0 and 6, and/or a partial hydrolytic condensate thereof;

(ii) a copolymer of $CR^1R^1=CR^1C(O)OR^1$ and $CR^1R^1=CR^1C(O)OR^2SiX_dR^1_{(3-4)}$, wherein each occurrence of $R^1$ is independently a C1-C8 alkyl or C6-C20 aryl; each occurrence of $R^2$ is independently a C2-C8 alkylene; each occurrence of X is independently a halogen atom, C1-C6 alkoxy, C1-C6 acyloxy, C1-C6 alkenoxy or hydroxide; and d is 1, 2 or 3; and combinations thereof;

(B) at least one silane having the general formula (2):

wherein each occurrence of $R^3$ is independently a C1-C8 alkyl, C2-C8 alkenyl or C6-C20 aryl, each occurrence of X is a halogen atom, C1-C6 alkoxy, C1-C6 acyloxy, C1-C6 alkenoxy or hydroxide; e is 0, 1 or 2, and/or a partial hydrolytic condensate thereof;

(C) metal oxide; and
(D) condensation catalyst;
(E) a UV absorber that is capable of co-condensing with at least one of components (A), (B) or (C);
wherein components (A), (B), (C) and (E) are hydrolytically condensed in the presence of component (D) to achieve a $T^3$ to $T^2$ ratio of from about 0.83 to about 2.5,
wherein said coating composition has been pre-cured for about 10 minutes to about 60 minutes at a temperature of from about 60° C. to about 90° C. and wherein said pre-cured coating composition is cooled to ambient temperature and then fully cured at a temperature of from about 160° C. to about 180° C.

40. The coating composition of claim 39 wherein the UV absorber is selected from the group consisting of 4-[gamma-(trimethoxysilyl)propoxyl]-2-hydroxy benzophenone, 4-[gamma-(triethoxysilyl)propoxyl]-2-hydroxy benzophenone, 4,6-dibenzoyl-2-(3-triethoxysilylpropyl) resorcinol, and combinations thereof.

* * * * *